(12) United States Patent
Vick, Jr.

(10) Patent No.: US 10,989,020 B2
(45) Date of Patent: Apr. 27, 2021

(54) BALANCE LINE SAFETY VALVE

(71) Applicant: Halliburton Energy Services, Inc., Houston, TX (US)

(72) Inventor: James Dan Vick, Jr., Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 191 days.

(21) Appl. No.: 16/081,008

(22) PCT Filed: Aug. 23, 2017

(86) PCT No.: PCT/US2017/048228
§ 371 (c)(1),
(2) Date: Aug. 29, 2018

(87) PCT Pub. No.: WO2019/040060
PCT Pub. Date: Feb. 28, 2019

(65) Prior Publication Data
US 2020/0308932 A1    Oct. 1, 2020

(51) Int. Cl.
| | |
|---|---|
| *E21B 34/10* | (2006.01) |
| *E21B 34/14* | (2006.01) |
| *E21B 34/16* | (2006.01) |
| *F16K 17/04* | (2006.01) |
| *F16K 17/36* | (2006.01) |

(52) U.S. Cl.
CPC .............. *E21B 34/14* (2013.01); *E21B 34/10* (2013.01); *E21B 34/16* (2013.01); *F16K 17/048* (2013.01); *F16K 17/36* (2013.01); *E21B 2200/05* (2020.05)

(58) Field of Classification Search
CPC .......... E21B 34/10; E21B 34/14; E21B 34/16; F16K 17/048; F16K 17/36
See application file for complete search history.

(56) References Cited

U.S. PATENT DOCUMENTS

| | | | | |
|---|---|---|---|---|
| 3,696,868 A | * | 10/1972 | Taylor, Jr. ............. | E21B 34/106 166/375 |
| 4,621,695 A | * | 11/1986 | Pringle ................... | E21B 34/10 166/321 |
| 6,003,605 A | * | 12/1999 | Dickson .................. | E21B 34/10 166/375 |

(Continued)

FOREIGN PATENT DOCUMENTS

WO    2015188080    12/2015

OTHER PUBLICATIONS

International Search Report and Written Opinion for PCT/US2017/048228 dated Aug. 23, 2017.

(Continued)

*Primary Examiner* — Matthew R Buck
(74) *Attorney, Agent, or Firm* — Scott Richardson; C. Tumey Law Group PLLC

(57) ABSTRACT

A system for actuating a balance line safety valve comprising: a balance line safety apparatus comprising: a balance chamber disposed in a well; a relief valve in fluid communication with the balance chamber; a check valve in fluid communication with the balance chamber; and a balance line in fluid communication with the relief valve and the check valve, a piston disposed in a well, wherein a back side of the piston is in fluid communication with the balance chamber; and a control line in fluid communication with a top of the piston.

20 Claims, 3 Drawing Sheets

(56) References Cited

U.S. PATENT DOCUMENTS

| | | | | |
|---|---|---|---|---|
| 6,173,785 B1* | 1/2001 | Adams | ............... | E21B 34/10 |
| | | | | 166/375 |
| 6,513,594 B1* | 2/2003 | McCalvin | ............... | E21B 34/10 |
| | | | | 166/320 |
| 7,624,807 B2* | 12/2009 | Vick, Jr. | ............... | E21B 34/066 |
| | | | | 166/373 |
| 8,616,291 B2* | 12/2013 | Smith | ............... | E21B 34/10 |
| | | | | 166/375 |
| 2006/0196669 A1* | 9/2006 | Lauderdale | ............... | E21B 34/10 |
| | | | | 166/321 |
| 2007/0068680 A1 | 3/2007 | Vick | | |
| 2008/0314599 A1* | 12/2008 | Bane | ............... | E21B 23/04 |
| | | | | 166/375 |
| 2009/0188662 A1* | 7/2009 | Casciaro | ............... | E21B 34/12 |
| | | | | 166/53 |
| 2009/0218096 A1 | 9/2009 | Vick | | |
| 2012/0073829 A1 | 3/2012 | Smith et al. | | |
| 2013/0092396 A1* | 4/2013 | Webber | ............... | E21B 34/10 |
| | | | | 166/375 |
| 2016/0138365 A1* | 5/2016 | Vick, Jr. | ............... | E21B 34/10 |
| | | | | 166/375 |

OTHER PUBLICATIONS

DepthStar Tubing-Retrievable Safety Valve a power point published by Halliburton Energy Services, Inc. in 2016.
Tubing-Retrievable Safety Valves, a power point published by Halliburton Energy Services, Inc. in 2016.
International Search Report and Written Opinion for PCT/US2017/048228 23 dated Jan. 2, 2018.

\* cited by examiner

BALANCE LINE SAFETY VALVE

BACKGROUND

Well safety valves may be installed in a wellbore to prevent uncontrolled release of reservoir fluids. One type of well safety valve, commonly referred to as a "balance line safety line safety valve," includes a control line and a balance line. The control line may extend from the valve to the surface. The balance line may be used to balance the control line hydrostatic pressure negating the effect of hydrostatic pressure from the control line. A typical balance line safety valve may be operated by displacing a piston of the balance line safety valve in response to a differential between pressure in the control line connected to the balance line safety valve and pressure in a tubing string in which the safety valve is interconnected. Additionally, the balance line extending from a point in the ocean to the back side of the piston may provide an upward force on the piston to balance the pressure exerted on the piston with the control line or annulus pressure if the control line is compromised. The balance line may also extend to the rig at the surface of the ocean.

A balance line safety valve may normally be failsafe if the control line is broken or blocked as the spring pressure may close the valve. In another instance, the valve may still close if the balance line is broken or blocked as long as the pressure differential in addition to the spring pressure falls within an operable range of the safety valve. In cases where there exists a low annulus pressure, there may not exist enough pressure to overcome the safety valve closing pressure.

BRIEF DESCRIPTION OF THE DRAWINGS

These drawings illustrate certain aspects of some examples of the present invention, and should not be used to limit or define the invention.

DETAILED DESCRIPTION

Provided are methods and apparatus for increasing the failsafe ability of a balance line safety valve. Failsafe may be defined as a condition in which in the system is damaged and balance line safety valve automatically closes or retains the ability to close. In some examples, the balance line safety valve may fail in a closed position, thus ensuring that production fluids are contained. In another example, the balance line safety valve may still be closed via a control line without the need for a balance line. The balance line safety valve may be positioned in a production string for controlling a production of subterranean formation fluids in offshore or onshore oil and gas wells. Disclosed herein a series of check and relief valves may be used to keep a pressure in a balance chamber to ensure a pressure differential across the piston may be within the operable range of the valve, thus addressing challenges that may occur in operating the balance line safety valve in conditions where the wellbore annulus pressure may be low.

Figure 1:
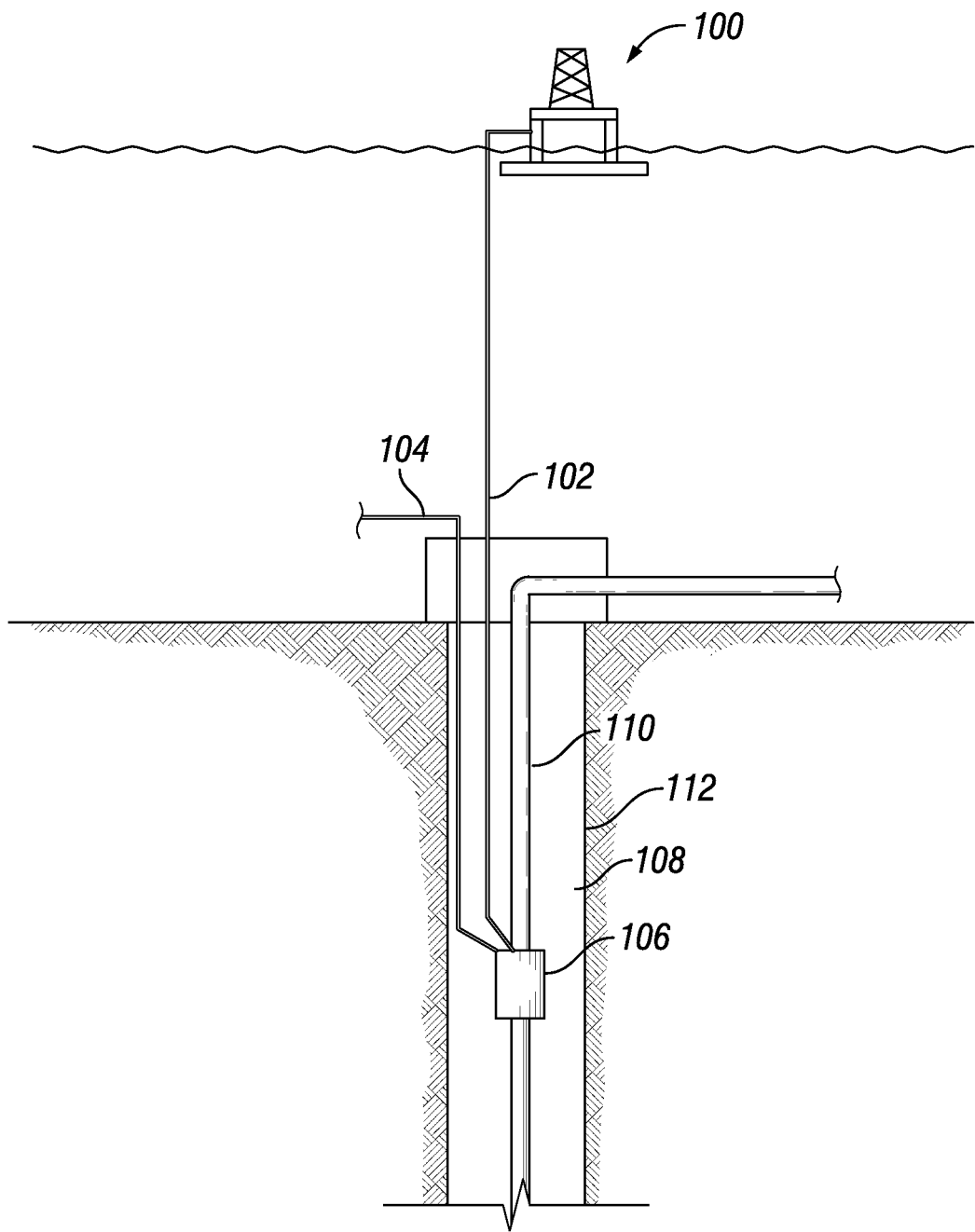
FIG. 1 is a view illustrating a production tubing having a safety valve assembly.

FIG. 1 illustrates is an offshore platform 100 connected to a balance line safety valve 106 via control line 102. Additionally, balance line 104 may provide balancing hydrostatic pressure to balance line safety valve 106. An annulus 108 may be defined between walls of well 112 and a conduit 110. Conduit 110 may be any conduit such as a casing, liner, production tubing, or other tubulars disposed in a wellbore. In the following description of the balance line safety valve 106 and other apparatus and methods described herein, directional terms, such as "above", "below", "upper", "lower", etc., are used only for convenience in referring to the accompanying drawings. Additionally, it is to be understood that the various embodiments of the present balance line safety valve described herein may be utilized in various orientations, such as inclined, inverted, horizontal, vertical, etc., and in various configurations, without departing from the principles of the present invention.

The balance line safety valve 106 may be interconnected in conduit 110 and positioned in well 112. Although well 112 as depicted in FIG. 1 is an offshore well, one of ordinary skill should be able to adopt the teachings herein to any type of well including onshore or offshore. A control line 102 may extend into the well 112 and may be connected to balance line safety valve 106. The control line 102 may be used to actuate balance line safety valve 106, for example, to maintain the balance line safety valve 106 in an open position and to close the balance line safety valve 106 to prevent a blowout in the event of an emergency.

In an example, control line 102 may be a hydraulic control line. Pressure may be applied to control line 102 at a remote location, such as a production platform or a subsea control station, to maintain balance line safety valve 106 in an open position. In FIG. 1, pressure may be applied to control line 102 at offshore platform 100. To close balance line safety valve 106, pressure in control line 102 may be reduced. Balance line 104 may provide a balancing pressure on balance line safety valve 106 such that the hydraulic pressure required to be supplied by control line 102 to actuate balance line safety valve 106 does not become too high. Control line pressure may become increasingly large with greater depths due to hydrostatic pressure from long columns of fluids in control line 102. Balance line 104 may counteract the increased pressure in the control line 102 by providing a pressure to a surface opposite of the hydrostatic pressure of the control line 102.

Although the control line 102 is depicted in FIG. 1 as being external to conduit 110, it should be understood that any hydraulic line may be used to convey actuation pressure to balance line safety valve 106. For example, control line 102 may be internal conduit 110, or formed in a sidewall of conduit 110. Additionally, balance line 104 may be internal to conduit 110, or formed in a sidewall. Balance line 104 may extend from a remote location, such as the earth's surface, or another location in the wellbore 112, or the actuation pressure could be generated by a pump or other pressure generation device attached to the balance line safety valve 106. Balance line 104, for example, may extend into the ocean in a subsea well, to offshore platform 100, or back to a surface wellhead in an onshore well.

Figure 2:
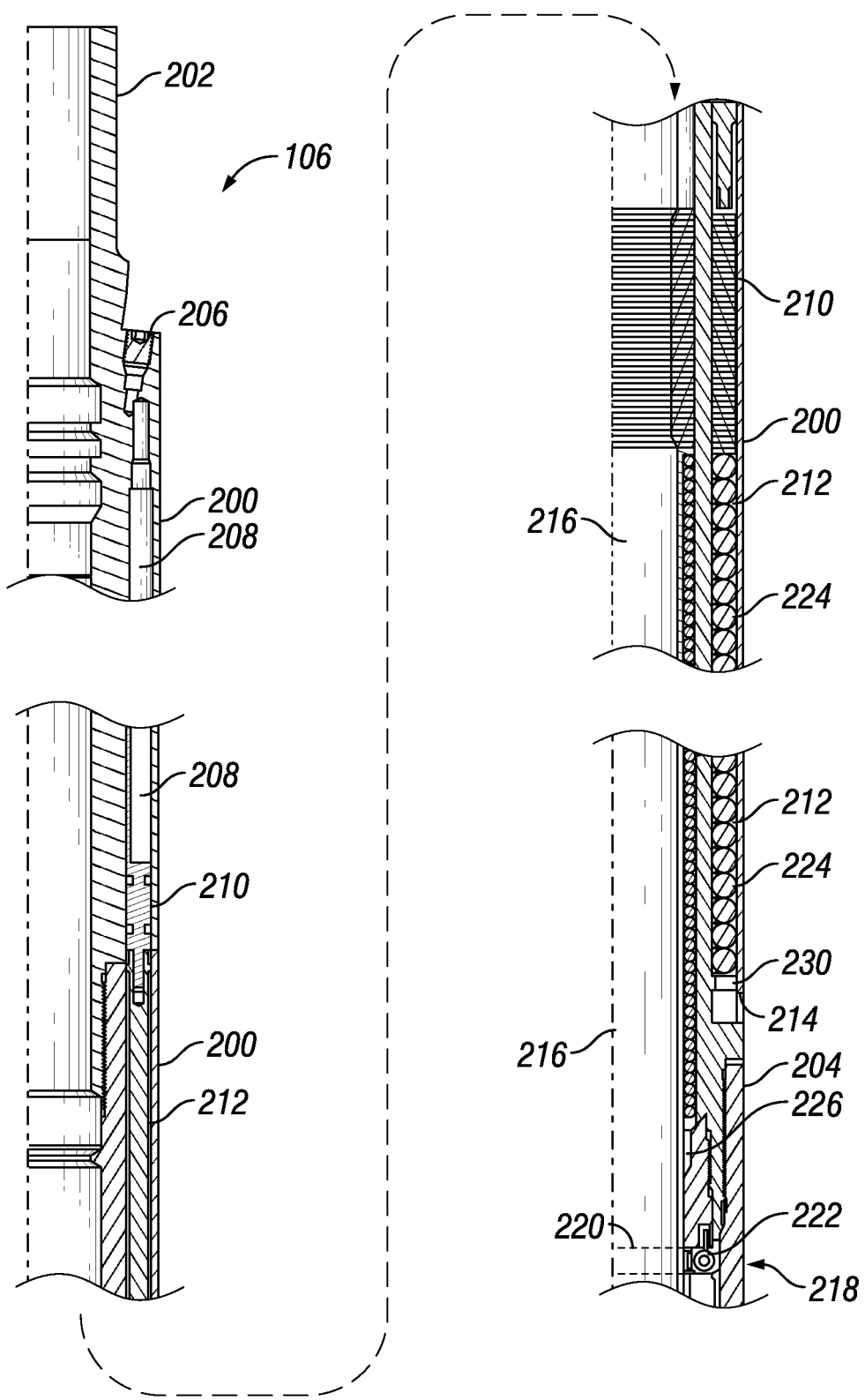
FIG. 2 is a schematic illustration of a balance line safety valve.

Referring to FIG. 2, an example of balance line safety valve 106 is shown in successive quarter-sectional views. Balance line safety valve 106 may comprise an outer housing assembly 200 with upper and lower connectors 202, 204 for interconnecting balance line safety valve 106 in conduit 110. A control line port 206 may be provided for connecting control line 102 to balance line safety valve 106.

Although control line port 206 is plugged as shown in FIG. 2, when control line 102 is connected to control line port 206, control line 102 is placed in fluid communication with an internal chamber 208 above a rod piston 210. Although piston 210 is depicted with a single rod in FIG. 2, it should be understood that any type and any number of pistons may be used, such as multiple rod pistons, or an annular piston, etc. The lower side of piston 210 may be in communication with balance chamber 212. Balance chamber 212 may be in communication via an opening 214 to balance line 104 (not shown). As previously described, balance line 104 may provide a balancing pressure. Pressure from balance line 104 may act on the lower side of piston 210 though fluid communication from opening 214. Pressure from balance line 104 may counteract pressure from control line 102 such that the pressure differential across piston 210 is reduced.

Safety valve 218 in balance line safety valve 106 may be a flapper-type. Flapper 220 may selectively open and close a flow passage 216 extending axially through the safety valve. A torsion spring 222 may bias the flapper 220 to pivot to its closed position. A tubular opening prong 224 may be used to displace the flapper 220 between its open and closed positions, and to protect the seal surfaces from damage. A downward movement of opening prong 224 may displace flapper 220 into an open position. Upward displacement of opening prong 224 may permit flapper 220 to rotate to its closed position. Although safety valve 218 is depicted as being a flapper-type safety valve, note that any type of safety valve may be constructed to embody principles of the invention. For example, safety valve 218 could instead be a ball-type safety valve, or a sleeve-type safety valve, and others well known in the art.

A spring 224 may bias piston 210 upwardly. When the differential between control line pressure and balance line pressure acting on piston 210 exceeds the upwardly biasing force of spring 224, piston 210 displaces downwardly. When the upwardly biasing force of spring 224 exceeds the force due to the pressure differential acting on piston 210, piston 210 displaces upwardly. A means of connecting prong 226 with piston 210 may be provided such as a magnetic system or a physical linkage. As piston 210 displaces upwards and downwards, the connection means causes the connecting prong 226 to displace in the same direction, thereby opening and closing the valve as described above.

In some instances, balance line 104 may break, be damaged, or become plugged and therefore unable to provide adequate balancing pressure to piston 210. In some cases, balance line 104 may become exposed to annulus 108, thereby applying annulus pressure to piston 210. Annulus pressure may not be as high as balance line pressure. In such a scenario, the spring and annulus pressure may not provide adequate force to overcome the static head in control line 102. Should such a condition occur, safety valve 218 would not be able to close due to the pressure differential driving piston 210 downward.

In order to provide an improved failsafe condition where the pressure differential across piston 210 does not exceed the maximum mechanical pressure spring 224 can generate, a balance line safety apparatus 230 may be provided.

Figure 3:
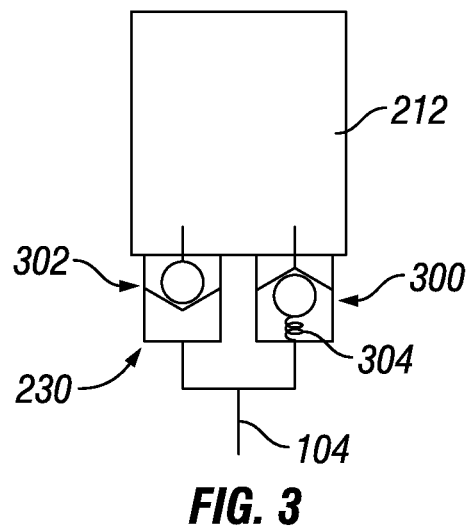
FIG. 3 is an illustration of a balance line safety apparatus.

With reference to FIG. 3, balance line safety apparatus 230 is shown. Balance line safety apparatus 230 may comprise relief valve 300 and check valve 302. Balance line safety apparatus 230 may be disposed between balance line 104 and balance chamber 212. The interior of balance line safety apparatus 230 may be in fluid communication with balance chamber 212 and balance line 104. Check valve 300 may be configured to allow one-way fluid flow into balance chamber 212 from balance line 104. Relief valve 300 may be configured to allow excess pressure from balance chamber 212 to flow into balance line 104. As the control line pressure is increased and piston 210 moves downwards, the fluid in balance chamber 212 may exit out of relief valve 300. Similarly, if the control line pressure is decreased, piston 210 moves up and fluid may flow into balance chamber 212 though check valve 226. As previously mentioned, in some cases balance line 104 may break and thereby not apply a sufficient pressure to piston 210 so the safety valve 218 (e.g., FIG. 2) can close. Balance line safety apparatus 230 should allow balance line pressure to remain in balance chamber 212 such that a pressure drop across piston 210 (e.g., FIG. 2) does not prevent safety valve 218 from closing.

Relief valve 300 may be any suitable relief valve such as, without limitation, a spring-loaded relief valve, a balanced spring loaded relief valve, or a pilot operated relief valve. Relief valve 300 should be sized such that a pressure in balance chamber 212 is high enough to allow safety valve 218 (e.g., FIG. 2) to close when pressure is reduced in the control line 102 (e.g., FIG. 1). A temperature increase within balance chamber 212 may cause a subsequent pressure increase in balance chamber 212. In certain conditions, the pressure may increase beyond the engineering limits of the materials used to construct the balance chamber which may lead to damage of balance chamber 212. In addition, an increased pressure in balance chamber 212 may cause the safety valve 218 to close without a decrease in pressure in the control line. One of ordinary skill in the art with the benefit of this disclosure should be able to select a relief valve for a particular application.

Relief valve 300 may open when a pressure differential across relief valve 300 is reached. The pressure differential may be about 200 psi to about 2000 psi. However, pressure differentials above or below this range may also be suitable depending, for example, on the particular application. In the instance where relief valve 300 is a spring-loaded valve, relief valve 300 may comprise spring 304. As previously mentioned, spring 304 may be selected to provide a force to keep relief valve 300 closed until a set pressure drop across relief valve 300.

It should be understood that pressure integrity across check and relief valves may be limited as the valves may leak and equalize pressure over time. However, in the event of a catastrophic closure, the pressure in the balance chamber is only required for a short amount of time. Once the safety valve closes, pressure in the conduit below the safety valve keeps the valve closed regardless of pressure in the balance chamber.

Figure 4:
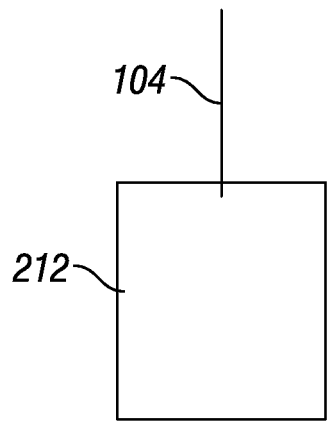
FIG. 4 is an illustration of a balance chamber.

With reference to FIG. 4, a balance line 104 and balance chamber 212 are depicted in a previous configuration. In this configuration, balance line 104 and balance chamber 212 are in direct fluid communication. The pressure in balance chamber 212 is directly dependent on the pressure in balance line 104. If balance line 104 is broken or damaged and loses pressure, pressure in the balance chamber 212 will also drop.

Figure 5:
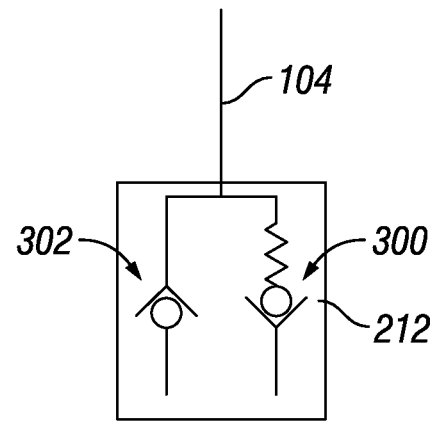
FIG. 5 is an illustration of a balance chamber and a balance line safety apparatus inside a balance chamber.

With reference to FIG. 5, an example of balance chamber 212 is depicted with relief valve 300 and check valve 302 positioned within and in fluid communication with balance chamber 212. Balance line 104 may be in fluid communication with relief valve 300 and check valve 302. As previously described, pressure changes in balance chamber 212 may allow fluid to enter check valve 302 and exit relief valve 300. In the instance that balance line 104 experiences a pressure drop, fluid may not exit balance chamber 212 until a set pressure drop across relief valve 300 is reached. Relief valve 300 may be configured such that a safety valve 218 (e.g., FIG. 2) as previously described may close even when annulus pressure is zero.

Figure 6:
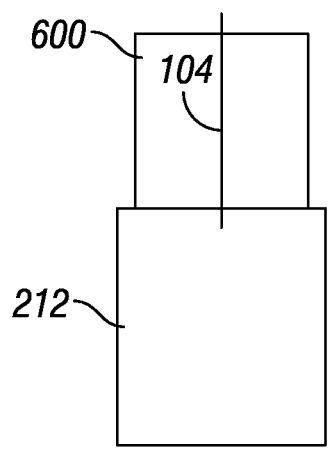
FIG. 6 is an illustration of a balance chamber and a top sub-assembly.

With reference to FIG. 6, a previous configuration of a balance chamber 212 is depicted. In this configuration, top sub-assembly 600 is positioned above balance chamber 212. Top sub-assembly 600 may be located in the top portion of balance line safety valve 106 (e.g., FIG. 2). In this configuration, balance line 104 and balance chamber 212 are in direct fluid communication. The pressure in balance chamber 212 is directly dependent on the pressure in balance line 104. If balance line 104 is broken or damaged and loses pressure, pressure in balance chamber 212 will also drop.

Figure 7:
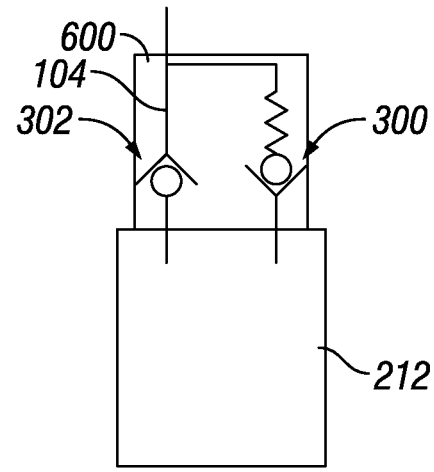
FIG. 7 is an illustration of a balance chamber and top sub-assembly with a balance line safety apparatus contained by the top sub-assembly.

With reference to FIG. 7, a balance chamber 212 is shown positioned within a top sub-assembly 600. Top sub-assembly 600 may be positioned in a top part of balance line safety valve 106 (e.g., FIG. 2). A relief valve 300 and check valve 302 are positioned within top sub-assembly 600 and are in fluid communication with balance chamber 212. Balance line 104 may be in fluid communication with relief valve 300 and check valve 302. As previously described, pressure changes in balance chamber 212 may allow fluid to enter check valve 302 and exit relief valve 300. In the instance that balance line 104 experiences a pressure drop, fluid may not exit balance chamber 212 until a set pressure drop across relief valve 300 is reached. Relief valve 300 may be configured such that a safety valve 218 as previously described may close even when annulus pressure is zero.

Although depicted in FIG. 2 as being disposed within balance chamber 212, balance line safety apparatus 230 may be disposed anywhere within balance line safety valve 106 including, but not limited to, a top assembly, top sub-assembly 600, a bottom assembly, external to balance line safety valve 106, or internally to balance line safety valve 106. A check valve 226 and a relief valve 228 may be disposed to provide fluid communication between balance line 104 and balance chamber 212.

Accordingly, this disclosure describes systems, methods, and apparatus that may relate to increase the failsafe ability of balance line safety valves. The systems, methods, and apparatus may further be characterized by one or more of the following statements:

Statement 1. A system for actuating a balance line safety valve comprising: a balance line safety apparatus comprising: a balance chamber disposed in a well; a relief valve in fluid communication with the balance chamber; a check valve in fluid communication with the balance chamber; and a balance line in fluid communication with the relief valve and the check valve, a piston disposed in a well, wherein a bottom of the piston is in fluid communication with the balance chamber; and a control line in fluid communication with a top of the piston.

Statement 2. The system of statement 1, wherein the balance line safety apparatus is disposed in a top sub-assembly of the balance line safety valve.

Statement 3. The system of statement 1 or 2, wherein the check valve and relief valve are operable to keep pressure in the balance chamber approximately equal to the balance line.

Statement 4. The system of any preceding statement, wherein the balance line is fluid communication with ocean.

Statement 5. The system of any preceding statement, wherein the piston is operable to open and close the balance line safety valve.

Statement 6. The system of any preceding statement, wherein the control line is connected to an offshore platform.

Statement 7. The system of any preceding statement, wherein well is an offshore or onshore well.

Statement 8. A system comprising: a safety valve disposed in a well, wherein the safety valve is operably moved by a piston; a balance chamber in fluid communication with one end of the piston; a control line in fluid communication with another end of the piston; a balance line; a relief valve in fluid communication with the balance chamber and the balance line; and a check valve in fluid communication with the balance chamber and the balance line.

Statement 9. The system of statement 8, wherein the safety valve is operable to seal a conduit in the well and prevent fluid flow through the conduit.

Statement 10. The system of statement 8 or 9, wherein the balance line is in fluid communication with an ocean.

Statement 11. The system of any preceding statement, wherein the relief valve and check valve are configured to allow pressure to remain in the balance chamber if the balance line becomes exposed to an annulus of the well.

Statement 12. The system of any preceding statement, wherein the relief valve is operable to open when pressure is increased in the control line and allow a fluid to exit the balance chamber.

Statement 13. The system of any preceding statement, wherein the check valve is operable to open when pressure is reduced in the control line and allow a fluid to enter the balance chamber.

Statement 14. The system of any preceding statement, wherein the relief valve and check valve are operable to keep pressure in the balance chamber approximately equal to the balance line.

Statement 15. A method comprising: placing a safety valve in a well wherein the safety valve is operable to seal a conduit disposed in the well and wherein the safety valve is actuated by a piston; placing a balance line safety device in the well, wherein the balance line safety device comprises: a balance chamber in fluid communication with a bottom of the piston; a relief valve in fluid communication with the balance chamber; a check valve in fluid communication with the balance chamber; and a balance line in fluid communication with the relief valve and the check valve; and placing a control line wherein the control line is in fluid communication with a top of the piston.

Statement 16. The method of statement 15, wherein the well is an offshore or onshore well.

Statement 17. The method of statement 15 or 16, wherein the balance line safety device is disposed in a top sub-assembly of the safety valve.

Statement 18. The method of any preceding statement, wherein the balance line is in fluid communication with an ocean.

Statement 19. The method of any preceding statement, wherein the control line is connected to an offshore platform.

Statement 20. The method of any preceding statement, wherein the relief valve and the check valve are operable to allow pressure to remain in the balance chamber if the balance line breaks in an annulus of the well.

EXAMPLE

To facilitate a better understanding of the disclosure, the following example of certain aspects of some embodiments is given. In no way should the following example be read to limit, or define, the entire scope of the embodiments.

The following prophetic example illustrates how the present balance line safety valve 106 can fail safe under damaged conditions. An example well 112 is tabulated in Table 1.

TABLE 1

| | |
|---|---|
| Control Line Pressure at Surface | 12000 psi |
| Static Head on Control Line 102 | 5000 psi |
| Static Head on Balance Line 104 | 5000 psi |
| High Annulus Pressure | 6000 psi |
| Low Annulus Pressure | 2000 psi |
| Safety Valve 218 Closing Pressure | 2000 psi |
| Safety Valve 218 Opening Pressure | 5000 psi |
| Relief Valve 300 Pressure Differential | 3000 psi |

In the previously described "old" configuration, if balance line 104 breaks, safety valve 218 cannot close as the pressure differential across piston is 3000 psi. The static head on control line 102 is 5000 psi and the annulus pressure is 2000 psi. The 2000 psi closing pressure of safety valve 218 cannot overcome the pressure.

In the new configuration comprising check valve 302 and relief valve 300, if balance line 104 breaks, safety valve 218 should still be able to close. The static head on control line 102 is 5000 psi, balance chamber 212 is 3000 psi, and the annulus pressure is 2000 psi. The pressure differential across piston 210 is 0 psi. The full 2000 psi closing pressure is applied to closing safety valve 218. In the instance that the annulus pressure is 0 psi, safety valve 218 can still close.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system for actuating a balance line safety valve comprising:
   a balance line safety apparatus comprising:
      a balance chamber disposed in a well;
      a relief valve in fluid communication with the balance chamber;
      a check valve in fluid communication with the balance chamber; and
   a balance line in fluid communication with the relief valve and the check valve, wherein the relief valve is adjacent to the check valve, wherein a first conduit extends from the balance line to the check valve, wherein a second conduit extends from the balance line to the relief valve;
   a piston disposed in the well, wherein a back side of the piston is in fluid communication with the balance chamber; and
   a control line in fluid communication with a top of the piston.

2. The system of claim 1, wherein the balance line safety apparatus is disposed in a top sub-assembly of the balance line safety valve.

3. The system of claim 1, wherein the check valve and the relief valve are operable to keep pressure in the balance chamber approximately equal to the balance line.

4. The system of claim 1, wherein the balance line is in fluid communication with an ocean.

5. The system of claim 1, wherein the piston is operable to open and close the balance line safety valve.

6. The system of claim 1, wherein the control line is connected to an offshore platform.

7. The system of claim 1, wherein the well is an offshore or onshore well.

8. A system comprising:
   a safety valve disposed in a well, wherein the safety valve is operably moved by a piston;
   a balance chamber in fluid communication with one end of the piston;
   a control line in fluid communication with another end of the piston;
   a balance line;
   a relief valve in fluid communication with the balance chamber and the balance line; and
   a check valve in fluid communication with the balance chamber and the balance line; and wherein the relief valve is adjacent to the check valve, wherein a first conduit extends from the balance line to the check valve, wherein a second conduit extends from the balance line to the relief valve.

9. The system of claim 8, wherein the safety valve is operable to seal a conduit in the well and prevent fluid flow through the conduit.

10. The system of claim 8, wherein the balance line is in fluid communication with an ocean.

11. The system of claim 8, wherein the relief valve and the check valve are configured to allow pressure to remain in the balance chamber if the balance line becomes exposed to an annulus of the well.

12. The system of claim 8, wherein the relief valve is operable to open when pressure is increased in the control line and allow a fluid to exit the balance chamber.

13. The system of claim 8, wherein the check valve is operable to open when pressure is reduced in the control line and allow a fluid to enter the balance chamber.

14. The system of claim 8, wherein the relief valve and the check valve are operable to keep pressure in the balance chamber approximately equal to the balance line.

15. A method comprising:
  placing a safety valve in a well wherein the safety valve is operable to seal a conduit disposed in the well and wherein the safety valve is actuated by a piston;
  placing a balance line safety device in the well, wherein the balance line safety device comprises:
    a balance chamber in fluid communication with a bottom of the piston;
    a relief valve in fluid communication with the balance chamber;
    a check valve in fluid communication with the balance chamber; and
    a balance line in fluid communication with the relief valve and the check valve, wherein the relief valve is adjacent to the check valve, wherein a first conduit extends from the balance line to the check valve, wherein a second conduit extends from the balance line to the relief valve; and
  placing a control line wherein the control line is in fluid communication with a top of the piston.

16. The method of claim 15, wherein the well is an offshore or onshore well.

17. The method of claim 15, wherein the balance line safety device is disposed in a top sub-assembly of the safety valve.

18. The method of claim 15, wherein the balance line is in fluid communication with an ocean.

19. The method of claim 15, wherein the control line is connected to an offshore platform.

20. The method of claim 15, wherein the relief valve and the check valve are operable to allow pressure to remain in the balance chamber if the balance line breaks in an annulus of the well.

* * * * *